United States Patent
Robergeau

(10) Patent No.: US 6,233,301 B1
(45) Date of Patent: May 15, 2001

(54) JET PUMP SENSING LINE T-BOLT CLAMP ELECTRODE DISCHARGE MACHINING TOOL

(75) Inventor: Merlene Robergeau, San Jose, CA (US)

(73) Assignee: General electric Company, Schenectady, NY (US)

(*) Notice: Subject to any disclaimer, the term of this patent is extended or adjusted under 35 U.S.C. 154(b) by 0 days.

(21) Appl. No.: 09/160,564

(22) Filed: Sep. 25, 1998

(51) Int. Cl.⁷ .............. G21C 13/00; B23H 1/00
(52) U.S. Cl. ............ 376/302; 376/260; 376/372; 376/461; 219/69.11; 219/69.15; 219/70
(58) Field of Search ............. 376/260, 302–304, 376/372, 461, 463; 219/69.15, 69.11, 69.17, 70

(56) References Cited

U.S. PATENT DOCUMENTS

| | | | | |
|---|---|---|---|---|
| 4,584,452 | * | 4/1986 | Zafred | 219/69 V |
| 4,627,142 | * | 12/1986 | Hornak | 29/283.5 |
| 4,665,293 | * | 5/1987 | Crespin | 219/69 V |
| 4,675,149 | * | 6/1987 | Perry et al. | 376/260 |
| 4,891,485 | * | 1/1990 | Briffod | 219/69.15 |
| 5,324,907 | * | 6/1994 | Wallace | 219/69.2 |
| 5,519,741 | * | 5/1996 | Suzuki et al. | 376/249 |
| 5,543,599 | * | 8/1996 | Cole et al. | 219/69.2 |
| 5,687,205 | * | 11/1997 | Matsumoto et al. | 376/260 |
| 5,752,807 | * | 5/1998 | Erbes | 417/63 |
| 5,802,126 | * | 9/1998 | Matsumoto et al. | 376/260 |

FOREIGN PATENT DOCUMENTS

| | | | | |
|---|---|---|---|---|
| 10-076427 | * | 3/1998 | (JP) | 376/260 |
| 10-100023 | * | 4/1998 | (JP) | 376/260 |
| 10-113824 | * | 5/1998 | (JP) | 376/260 |

* cited by examiner

Primary Examiner—Michael J. Carone
Assistant Examiner—Jack Keith
(74) Attorney, Agent, or Firm—Armstrong Teasdale LLP

(57) ABSTRACT

An electrode discharge machining (EDM) apparatus for machining slots in a jet pump diffuser in a nuclear reactor pressure vessel is described. The apparatus is configured to machine a plurality of slots in the diffuser at positions behind the diffuser sensing line within the plane formed by the center of the diffuser and the sensing line. The apparatus includes a housing, a plurality of clamp assemblies, a hook assembly configured to engage the sensing line standoff so that the apparatus is positioned at an angle from a plane formed by the center of the diffuser and the sensing line, and a plurality of electrode assemblies. The EDM apparatus can be configured to be installed clockwise or counter-clockwise around the sensing line depending on the spacing available around given diffusers. The EDM apparatus is capable of burning a plurality of slots at the same time, thereby saving time and money.

12 Claims, 5 Drawing Sheets

JET PUMP SENSING LINE T-BOLT CLAMP ELECTRODE DISCHARGE MACHINING TOOL

BACKGROUND OF THE INVENTION

This invention relates generally to nuclear reactors and more particularly, to methods and apparatus for securing pressure lines to jet pumps in a nuclear reactor.

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core and is supported by a shroud support structure. Particularly, the shroud has a generally cylindrical shape and surrounds both the core plate and the top guide. There is a space or annulus located between the cylindrical reactor pressure vessel and the cylindrically shaped shroud.

Boiling water reactors have numerous piping systems, and such piping systems are utilized, for example to transport water throughout the RPV. For example, core spray piping is routed over and through the shroud to deliver water to the reactor core.

Jet pump diffusers in a nuclear reactor, such as in a boiling water nuclear reactor, typically form part of a jet pump and are utilized to maintain the floodability of the reactor core at a safe level. The jet pump diffuser also typically discharges water from an inlet mixer into the lower core plenum to maintain adequate recirculation flow.

One known jet pump diffuser has a generally conical shape, and the larger diameter end of the diffuser is welded to an adapter assembly engaged to an INCONEL nickel-chromium alloy shroud support plate. The smaller diameter end of the diffuser forms a slip fit connection to the inlet mixer section of the jet pump.

Water, generally under high pressure, flows through the jet pump diffuser from the smaller diameter end to the larger diameter end. The water exits the diffuser at the larger diameter end and is discharged through the adapter assembly into the lower core plenum. The discharged water mixes with the water in the lower core plenum and may cycle through the reactor.

As the water flows through the jet pump diffuser, the speed of the water decreases due to the increasing diameter of the diffuser. Decreasing the water speed and pressure just prior to discharging the water into the lower core plenum improves the mixing and flow characteristics of the discharged water.

For safe operation of a nuclear plant, the pressure drop across the diffuser is continually monitored. For this purpose, small sensing lines are mounted to the exterior of the diffuser, and communicate through the walls of the diffuser so that the pressure differential may be sensed.

Under certain conditions, the pressure sensing lines may vibrate. This vibration subjects the stainless steel stand off blocks mounted between the diffuser and line to sever between the block and line. This severance of the line from its mounted stand off block is an undesirable condition.

T-Bolt clamps have been developed that clamp the diffuser sensing lines to the diffuser providing added support and minimizing vibration. To secure the T-bolt clamp to the diffuser, slots need to be machined into the diffuser so that the T-bolt can be inserted into the slot. The T-bolt clamp is then secured around the sensing line to prevent excessive vibration of the sensing line. The slot must be positioned behind the sensing line. Typically such slots are burned or machined into the diffuser by using an electrode discharge machining (EDM) process. A major problem to overcome is burning the slot into the diffuser behind the sensing line without burning and damaging the sensing line at the same time.

It would be desirable to provide a EDM tool for burning slots or holes in the diffuser behind the sensing line that will not damage the sensing line during the EDM process.

BRIEF SUMMARY OF THE INVENTION

These and other objects may be attained by an electrode discharge machining apparatus capable of machining precisely located and sized slots in a jet pump diffuser in a nuclear reactor. Particularly, the EDM apparatus, or tool, is capable of machining two slots in the jet pump diffuser at a location behind the diffuser sensing line without damaging the sensing line. Behind the sensing line may be defined as within the plane formed by the center of the diffuser and the sensing line.

The EDM tool includes a housing, two EDM electrode assemblies, two clamp assemblies, and a hook assembly. Each EDM electrode assembly includes an electrode holder and an electrode configured to be coupled to the holder and to form the desired slot in the diffuser. Each slot extends through the wall of the jet pump diffuser and is configured to accept a T-bolt vibration clamp that is configured to secure the sensing line to the sensing line standoff to prevent vibration of the sensing line during operation of the reactor. In one embodiment of the present invention, each slot machined in the diffuser has the dimension of about 1.06 by 0.4 inches.

The EDM apparatus also includes a stepper drive motor coupled to the electrode assemblies. The stepper drive motor moves the electrode assemblies so that the electrodes maintain a predetermined distance from the diffuser during the electrode discharge machining process. Particularly, as the electrode machines a hole through the diffuser the position of the electrode relative to the diffuser is adjusted by the stepper drive motor so that a constant distance is maintained between the electrode and the bottom of the hole being machined in the diffuser.

Each clamp assembly includes a clamp arm coupled to a movable shaft. The shaft is movably coupled to an actuation cylinder. The actuation cylinder may be a fluid or an air actuation cylinder. The clamp arm is configured to engage the sensing line to clamp the EDM apparatus to the sensing line. Particularly, the clamp arm exerts a clamping force on the sensing line to clamp the line between the arm and the housing.

The hook assembly includes a flat hook shaped member configured to engage the sensing line standoff block. The hook assembly also includes a cylindrically shaped member depending horizontally from the flat hooked shaped member. The hook assembly is coupled to the housing at an angle and is configured so that when the flat hooked shaped member engages the standoff, the EDM apparatus is positioned at an angle from a plane formed by the center of jet pump diffuser and the sensing line. In one embodiment, the hook assembly is configured so that the EDM apparatus is positioned at about a 21° angle from the plane formed by the center of the jet pump diffuser and the sensing line. This configuration is used so that the holes can be machined behind the sensing line without damaging the sensing line.

To machine slots in the jet pump diffuser configured for the installation of T-bolt clamps, the EDM apparatus is lowered into the annulus of the reactor pressure vessel with a handling pole. The EDM apparatus is positioned adjacent the diffuser with the hook assembly engaging the sensing line standoff. Because of restricted spacing around the jet pump diffusers in the annulus of the reactor, the EDM apparatus may be configured to be installed clockwise around the sensing line or may be configured to be installed counter-clockwise around the sensing line.

When properly positioned, the hook assembly engages the sensing line standoff and positions the EDM apparatus at an angle of 21° from the plane formed by the center of the diffuser and the sensing line. The clamp assemblies are then actuated causing the clamping arms to clamp the EDM apparatus to the sensing line. In this configuration the EDM apparatus is properly positioned so that each EDM electrode is adjacent the diffuser to burn a slot or hole in the diffuser behind the sensing line. The EDM process is then actuated and each electrode machines a 1.06 by 0.4 inch hole in the diffuser behind the sensing line. Typically, the holes are machined simultaneously. Each hole is configured to accept a T-bolt vibration clamp that is configured to secure the sensing line to the sensing line standoff to prevent vibration of the sensing line during the operation of the reactor.

The EDM apparatus clamping assemblies are then released and the EDM apparatus is removed from the sensing line and either repositioned on another diffuser or removed from the reactor. Typically, each electrode is capable of machining two holes before needing to be replaced. This permits the EDM apparatus to machine four slots or holes before having to be removed from the reactor for electrode replacement.

The above described EDM tool is capable of burning a slot or hole in the diffuser at a location behind the sensing line pipe. Additionally, the EDM tool is capable of burning two holes at the same time, thereby saving time and money. The EDM tool is configured such that it clamps on the sensing line standoff at an angle of approximately 21° from the plane formed by the center of the diffuser and the sensing line. This configuration is used so that the holes can be burnt behind the sensing line without damaging the sensing line. The EDM tool can be configured to be installed clockwise or counter-clockwise around the sensing line depending on the spacing available around given diffusers. Additionally, one set of electrodes can be used twice, therefore reducing the potential radiation exposure involved in changing electrodes.

DETAILED DESCRIPTION OF THE INVENTION

Figure 1:
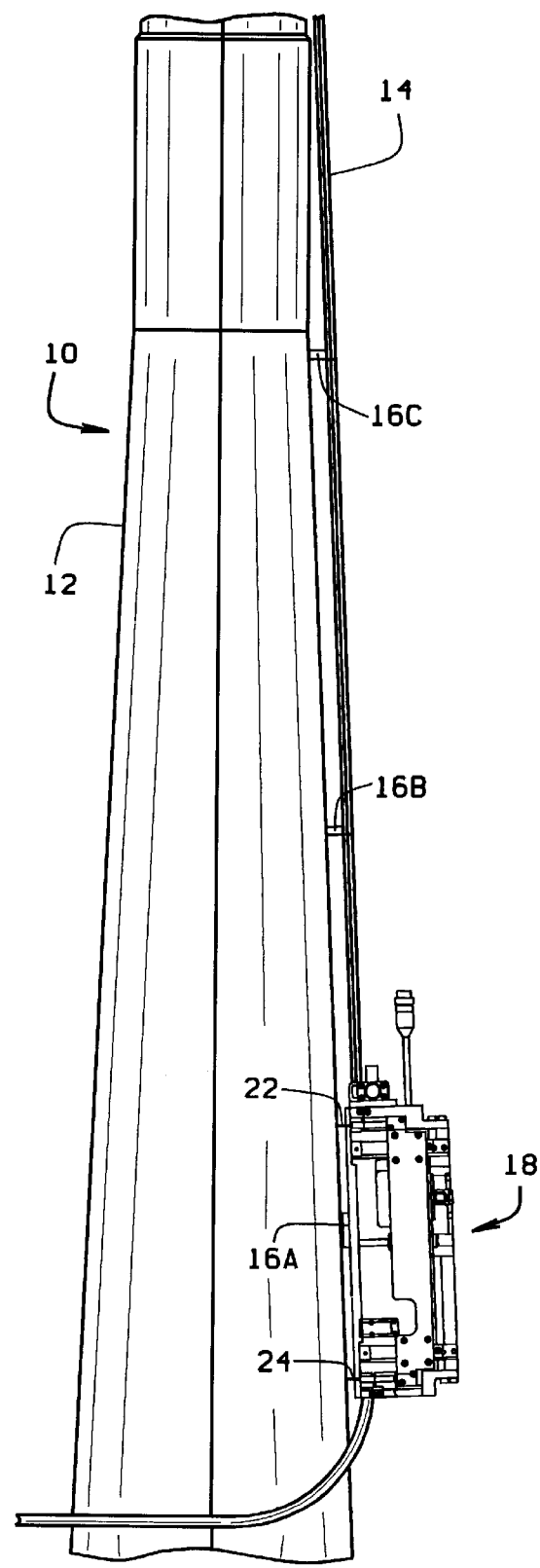
FIG. 1 is a side view of a boiling water reactor jet pump diffuser with an electrode discharge machining apparatus in accordance with one embodiment of the present invention clamped to the diffuser sensing line.

FIG. 1 is a side view of a boiling water nuclear reactor jet pump assembly 10. Jet pump assembly 10 includes a jet pump diffuser 12 and a sensing line 14. Sensing line standoffs 16A, 16B, and 16C couple sensing line 14 to diffuser 12. An EDM apparatus 18 in accordance with one embodiment of the present invention is clamped to sensing line 14 at sensing line standoff 16A. EDM apparatus 18 includes electrodes 22 and 24, configured to machine holes in diffuser 12 at positions behind sensing line 14.

Figure 2:
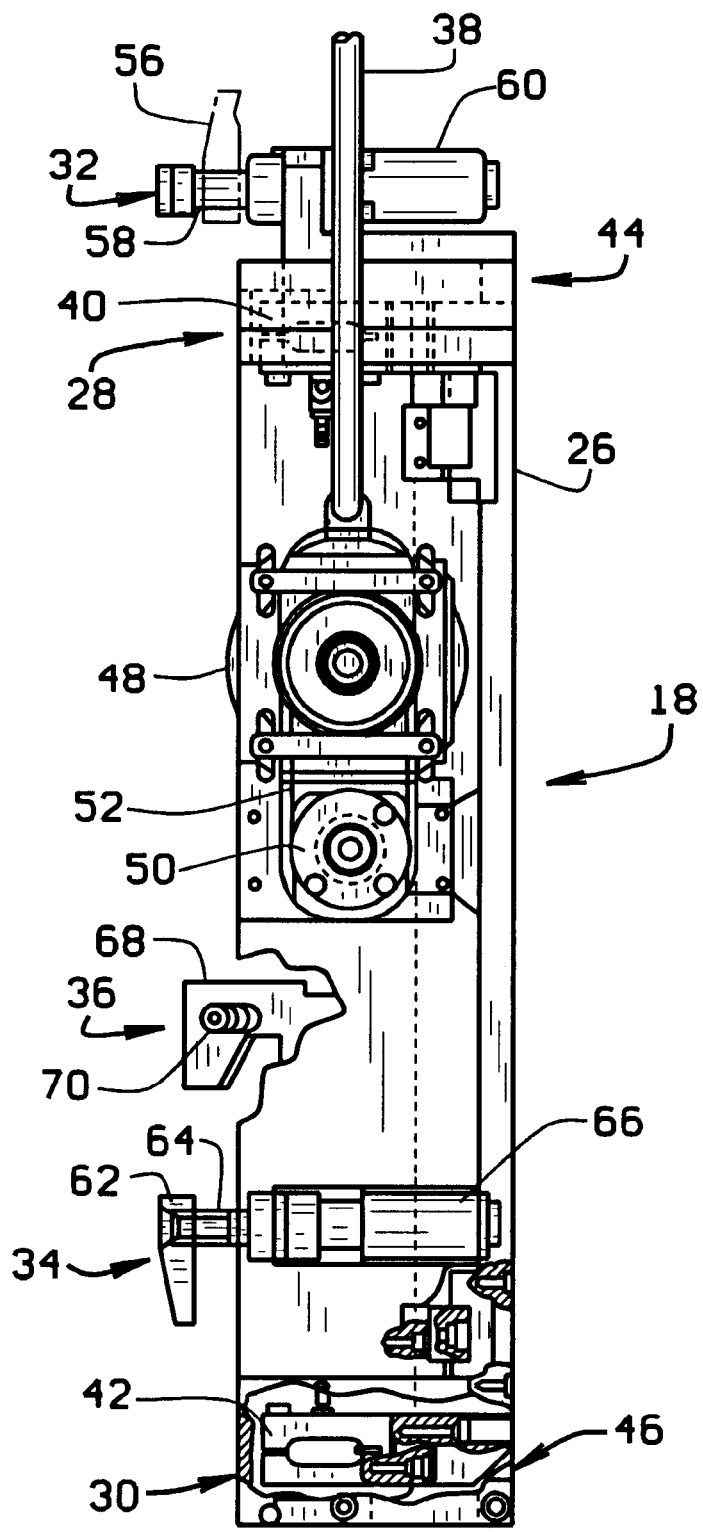
FIG. 2 is a front view, with parts cut-away, of the electrode discharge machining apparatus illustrated in FIG. 1.
Figure 3:
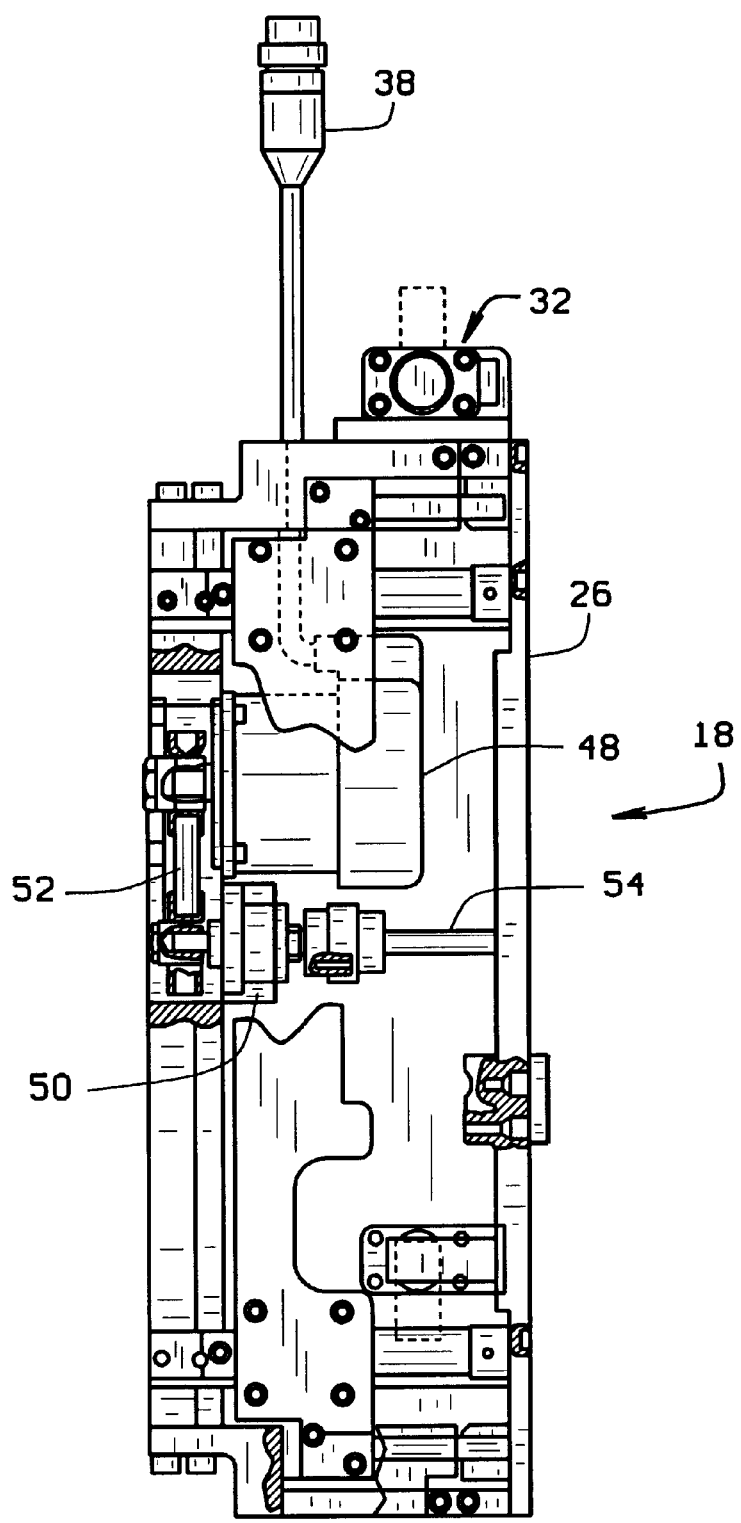
FIG. 3 is a side view, with parts cut-away, of the electrode discharge machining apparatus illustrated in FIG. 1.
Figure 4:
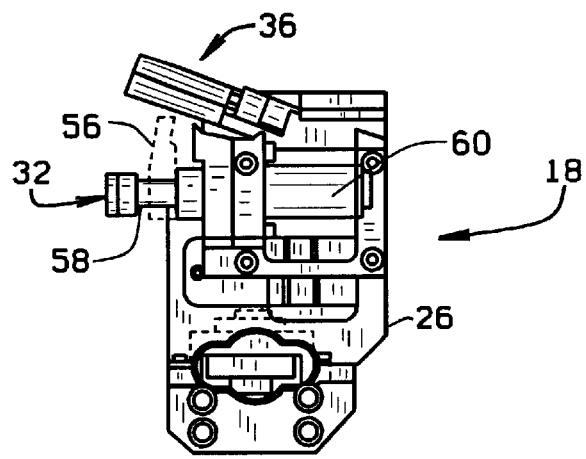
FIG. 4 is a top view, with parts cut-away, of the electrode discharge machining apparatus illustrated in FIG. 1.

FIGS. 2, 3, and 4 illustrate front, side, and top views, with parts cut away, respectively of EDM apparatus 18. EDM apparatus 18 includes a housing 26, two EDM electrode assemblies 28 and 30, two clamp assemblies 32 and 34, a hook assembly 36, and an electrical connector 38 configured to couple to an electrical cable (not shown) to supply power to EDM apparatus 18.

EDM electrode assemblies 28 and 30 include electrode holders 40 and 42 respectively. Particularly, electrode holder 40 is movably coupled to a first end 44 of apparatus 18 and electrode holder 42 is movably coupled to a second end 46 of apparatus 18. Holders 40 and 42 are configured to hold electrodes 22 and 24 (shown in FIG. 1).

EDM apparatus 18 includes a stepper drive motor 48 coupled to electrode assemblies 28 and 30. Particularly, stepper drive motor 48 is coupled to a drive gear box 50 by drive belt 52. Drive gear box 50 is coupled to electrode assemblies 28 and 30 through adjustment shaft 54 and a plurality of linkages (not shown). Stepper drive motor 48 moves electrode assemblies 28 and 30 so that the electrodes 22 and 24 maintain a predetermined distance from diffuser 12 during the electrode discharge machining process. Particularly, as electrodes 22 and 24 each machines a hole through diffuser 12, the position of electrodes 22 and 24 relative to diffuser 12 is adjusted by stepper drive motor 48 so that a constant distance is maintained between electrodes 22 and 24 and the bottom of the holes being machined in diffuser 12.

Clamp assembly 32 is coupled to first end 44 of apparatus 18, and clamp assembly 34 is coupled to second end 46 of apparatus 18. Clamp assembly 32 includes a clamping arm 56 movably coupled to a movable shaft 58 which is movably coupled to an actuation cylinder 60. Likewise, clamp assembly 34 includes clamping arm 62 movably coupled to movable shaft 64 which is movably coupled to actuation cylinder 66. Clamping arms 56 and 62 are each configured to engage sensing line 14 to clamp EDM apparatus 18 to sensing line 14. Particularly, each clamping arm 56 and 62 exerts a clamping force on sensing line 14 to clamp sensing line 14 between arms 56 and 62 and housing 26.

Hook assembly 36 includes a flat hook shaped member 68 configured to engage sensing line standoff block 16A. Hook assembly 36 also includes a cylindrically shaped member 70 depending horizontally from flat hooked shaped member 68. Hook assembly 36 is coupled to housing 26 at an angle and is configured so that when flat hooked shaped member 68 engages standoff 16A, EDM apparatus 18 is positioned at an angle A (shown in FIG. 5) from a plane P (shown in FIG. 5) formed by the center C (shown in FIG. 5) of jet pump diffuser 12 and sensing line 14. In one embodiment, hook assembly 36 is configured so that EDM apparatus 18 is positioned so that angle A is about 21°. This configuration is used so that holes can be machined behind sensing line 14 without damaging sensing line 14.

Figure 5:
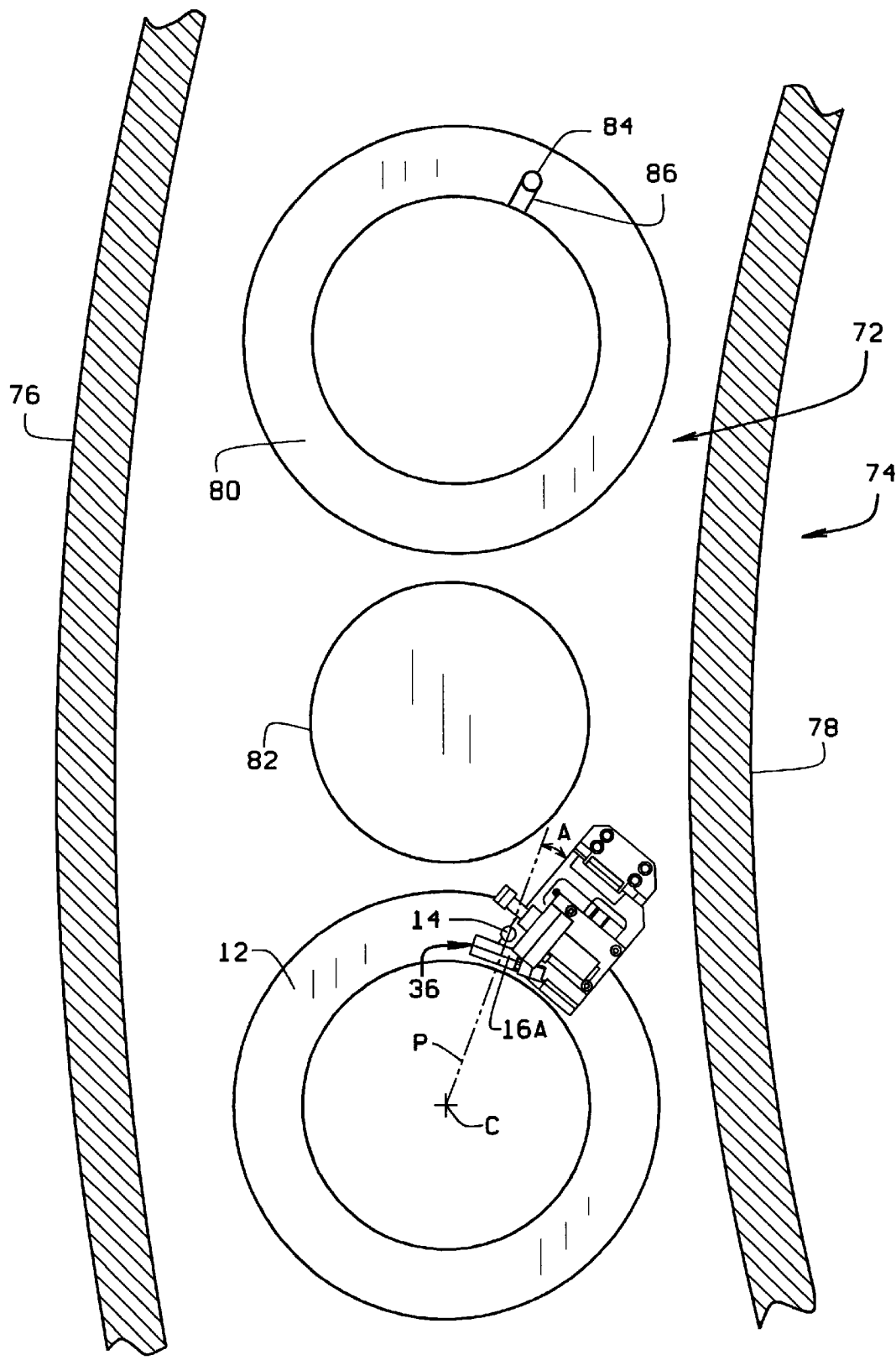
FIG. 5 is a top view of an annulus of a reactor pressure vessel illustrating the electrode discharge machining apparatus shown in FIG. 1 clamped to a sensing line of a jet pump diffuser.

FIG. 5 is a top view of an annulus 72 of a nuclear reactor pressure vessel 74 showing EDM apparatus 18 installed in pressure vessel 74. Annulus 72 is formed by sidewall 76 and a core shroud 78 of reactor pressure vessel 74. Located in annulus 72 are two jet pump diffusers 12 and 80, and a jet pump riser pipe 82. Sensing lines 14 and 84 are coupled to diffusers 12 and 80 respectively by standoffs 16A and 86.

Figure 6:
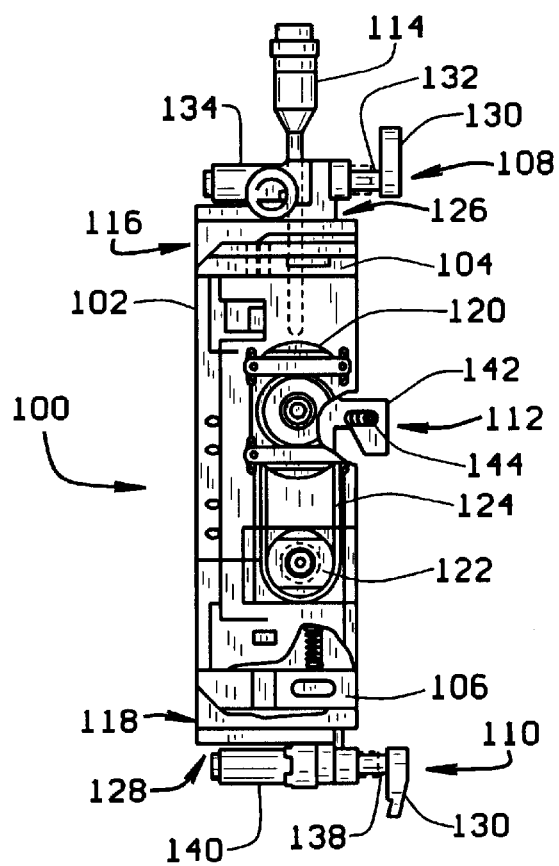
FIG. 6 is a front view, with parts cut away of an electrode discharge machining apparatus in accordance with another embodiment of the present invention.

FIG. 6 is a side view, with parts cut away, of an EDM apparatus 100 in accordance with another embodiment of the present invention. EDM apparatus 100 is similar to EDM apparatus 18 except for the location of the two clamp assemblies. EDM apparatus 100 includes a housing 102, two EDM electrode holders 104 and 106, two clamp assemblies 108 and 110, a hook assembly 112, and an electrical connector 114 configured to couple to an electric cable (not shown) to supply power to EDM apparatus 100.

Particularly, electrode holder 104 is movably coupled to a first end 116 of apparatus 100 and electrode holder 106 is movably coupled to a second end 118 of apparatus 100. Holders 104 and 106 are configured to hold EDM electrodes (not shown). A stepper drive motor 120 is coupled to drive gear box 122 by drive belt 124. Drive gear box 122 is coupled to electrode holders 104 and 106.

Clamp assembly 108 is coupled to a top 126 of apparatus 100, and clamp assembly 110 is coupled to a bottom 128 of apparatus 100. Clamp assembly 108 includes a clamping arm 130 movably coupled to a movable shaft 132 which is movably coupled to an actuation cylinder 134. Likewise, clamp assembly 110 includes clamping arm 136 movably coupled to movable shaft 138 which is movably coupled to actuation cylinder 140. Clamping arms 108 and 110 are each configured to engage diffuser sensing line 14 (shown in FIG. 1) to clamp EDM apparatus 100 to sensing line 14 (shown in FIG. 1).

Hook assembly 112 includes a flat hook shaped member 142 configured to engage diffuser sensing line standoff block 16 (shown in FIG. 1). Hook assembly 112 also includes a cylindrically shaped member 144 depending horizontally from flat hooked shaped member 142 Hook assembly 112 is coupled to housing 102 at an angle and is configured so that when flat hooked shaped member 136 engages standoff 16 (shown in Figure), EDM apparatus 100 is positioned at an angle from a plane formed by the center of jet pump diffuser 12 (shown in FIG. 1) and diffuser sensing line 14 (shown in FIG. 1). In one embodiment, hook assembly 112 is configured so that EDM apparatus 100 is positioned so that angle A (shown in FIG. 5) is about 21°.

To machine slots configured for the installation of T-bolt clamps (not shown) in jet pump diffuser 12, EDM apparatus 18 is lowered into annulus 70 of reactor pressure vessel 74, typically with ropes. EDM apparatus 18 is positioned adjacent diffuser 12 with hook assembly 36 engaging diffuser sensing line standoff 16A. Because of restricted spacing around jet pump diffusers 12 and 80 in annulus 72, EDM apparatus 18 is configured to be installed counter-clockwise around sensing line 14. To install EDM apparatus 18 on diffuser sensing line 84 of diffuser 10, apparatus 18 would be configured to be installed clockwise around sensing line 80. In other words, the EDM apparatus would be a mirror image of EDM apparatus 18 shown in FIG. 1.

When properly positioned, hook assembly 36 engages sensing line standoff 16 and positions EDM apparatus 18 so that angle A is about 21°. Clamp assemblies 32 and 34 are then actuated causing clamping arms 56 and 62 to clamp EDM apparatus 18 to diffuser sensing line 14. In this configuration, EDM apparatus 18 is properly positioned so that EDM electrodes 22 and 24 are adjacent diffuser 12 to burn a slot or hole in diffuser 12 behind sensing line 14. The EDM process is then actuated and electrodes 22 and 24 each machines a 1.06 by 0.4 inch hole in diffuser 12 behind diffuser sensing line 14. Stepper drive motor 48 adjusts the position of electrodes 22 and 24 relative to diffuser 12 during the EDM process. Typically, the holes are machined simultaneously. Each hole is configured to accept a T-bolt vibration clamp (not shown) that is configured to secure sensing line 14 to sensing line standoff 16 to prevent vibration of sensing line 14 during the operation of reactor 74.

EDM apparatus 18 clamping assemblies 32 and 34 are then released and EDM apparatus 18 is removed from diffuser sensing line 14 and either repositioned on another diffuser or removed from reactor pressure vessel 74. Typically, electrodes 22 and 24 are each capable of machining two holes before needing to be replaced. This permits EDM apparatus 18 to machine four slots or holes before having to be removed from reactor pressure vessel 74 for electrode replacement.

The above described EDM tool 18 is capable of burning a slot or hole in diffuser 12 at a location behind sensing line pipe 14. Additionally, EDM tool 18 is capable of burning two holes at the same time, thereby saving time and money. EDM tool 18 is configured so that the holes can be burnt behind sensing line 14 without damaging sensing line 14. EDM tool 18 can be configured to be installed clockwise or counter-clockwise around a diffuser sensing line depending on the spacing available around given diffusers. Additionally, electrodes 22 and 24 can be used twice, therefore reducing the potential radiation exposure involved in changing electrodes.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. An electrode discharge machining apparatus for machining slots in a jet pump diffuser in a nuclear reactor pressure vessel at positions within a plane formed by a center of the diffuser and a sensing line, the jet pump diffuser having a center, a diffuser sensing line, and a sensing line standoff coupling the sensing line to the diffuser, said apparatus comprising:

a housing;

a plurality of clamp assemblies coupled to said housing;

a hook assembly coupled to said housing and configured to engage a jet pump diffuser sensing line standoff so that said apparatus is positioned at an angle from a plane formed by the center of the diffuser and the sensing line; and a plurality of electrode assemblies coupled to said housing.

2. An apparatus in accordance with claim 1 comprising two clamp assemblies.

3. An apparatus in accordance with claim 1 comprising two electrode assemblies.

4. An apparatus in accordance with claim 1 wherein said hook assembly is configured to engage the sensing line standoff so that said apparatus is positioned at an angle of 21° from the plane formed by the center of the diffuser and the sensing line.

5. An apparatus in accordance with claim 4 wherein said hook assembly comprises a flat hook shaped member and a cylindrically shaped member depending from said hook shaped member, said hook shaped member configured to engage the sensing line standoff.

6. An apparatus in accordance with claim 2 wherein each said clamp assembly comprises a clamping arm and an actuation cylinder coupled to said clamping arm by a movable shaft, said clamping arm configured to engage the sensing line.

7. An apparatus in accordance with claim 3 wherein each said electrode assembly comprises an electrode holder movably coupled to said housing and an electrode coupled to said electrode holder, said electrode configured to form a slot in the diffuser.

8. An electrode discharge machining apparatus for machining slots in a jet pump diffuser in a nuclear reactor pressure vessel at positions within a plane formed by a center of the diffuser and a sensing line, the jet pump diffuser having a center, a diffuser sensing line, and a sensing line standoff coupling the sensing line to the diffuser, said apparatus comprising:

a housing;

two clamp assemblies coupled to said housing;

a hook assembly coupled to said housing and configured to engage a jet pump diffuser sensing line standoff so that said apparatus is positioned at an angle from a plane formed by the center of the diffuser and the sensing line; and two electrode assemblies coupled to said housing.

9. An apparatus in accordance with claim 8 wherein said hook assembly is configured to engage the sensing line standoff so that said apparatus is positioned at an angle of 21° from the plane formed by the center of the diffuser and the sensing line.

10. An apparatus in accordance with claim 9 wherein said hook assembly comprises a flat hook shaped member and a cylindrically shaped member depending from said hook shaped member, said hook shaped member configured to engage the sensing line standoff.

11. An apparatus in accordance with claim 8 wherein each said clamp assembly comprises a clamping arm and an actuation cylinder coupled to said clamping arm by a movable shaft, said clamping arm configured to engage the sensing line.

12. An apparatus in accordance with claim 8 wherein each said electrode assembly comprises an electrode holder movably coupled to said housing and an electrode configured to be coupled to said electrode holder and to form a slot in the diffuser.

* * * * *